United States Patent [19]

Reavell

[11] Patent Number: 4,816,804
[45] Date of Patent: Mar. 28, 1989

[54] SCHOOL BUS STOP SIGN CONTROL APPARATUS

[75] Inventor: James Reavell, Campbellford, Canada

[73] Assignee: School Bus Parts Co. of Canada Inc., Campbellford, Canada

[21] Appl. No.: 156,535

[22] Filed: Feb. 16, 1988

Related U.S. Application Data

[63] Continuation-in-part of Ser. No. 33,110, Apr. 1, 1987, Pat. No. 4,766,413.

[51] Int. Cl.$^4$ ............................................. G08B 5/22
[52] U.S. Cl. ................................. 340/433; 340/487; 318/282; 180/281; 180/289; 246/125; 116/28 R
[58] Field of Search ............. 340/130, 120, 142, 52 R, 340/87, 84, 133; 318/34, 54, 282; 40/459, 460, 470, 601; 49/26, 28; 180/271, 281, 289; 246/125-127; 116/28 R, 63 R

[56] References Cited

U.S. PATENT DOCUMENTS

| | | | |
|---|---|---|---|
| 2,155,617 | 4/1939 | Roan et al. | 340/130 |
| 2,243,472 | 5/1941 | Roan et al. | 340/130 |
| 3,153,398 | 10/1964 | Runkle et al. | |
| 4,559,518 | 12/1985 | Latta, Jr. | 340/130 |

*Primary Examiner*—Donnie L. Crosland
*Attorney, Agent, or Firm*—Michael Ebert

[57] ABSTRACT

The apparatus is provided with a unidirectional motor operatively coupled to the hinged sign through an eccentric drive by a link arm which incorporates a preloaded helical compression spring to prevent damage to the link arm should an attempt be made to forcibly swing the sign. Two normally-closed limit switches are associated with the link arm whereby in the course of a motor operating cycle, the stop sign is caused by the link arm to swing out to its outstretched position, at which point one limit switch opens, and then to return to its retracted position, at which point the other limit switch opens. The limit switches are included in a control circuit which supplies power to the motor. The control circuit is responsive to a door switch associated with the bus door so that when the door is open, the door switch is then closed, and power is supplied to the motor through one limit switch until the sign reaches its outstretched position, at which point this limit switch is opened to cut off the motor. When the door is closed and the door switch is then open, power is supplied to the motor through the other limit switch until the sign reaches its retracted position, at which point the motor is then cut off. Thus the operation of the sign is coordinated with that of the bus door to provide a stop signal when the need therefor arises.

5 Claims, 2 Drawing Sheets

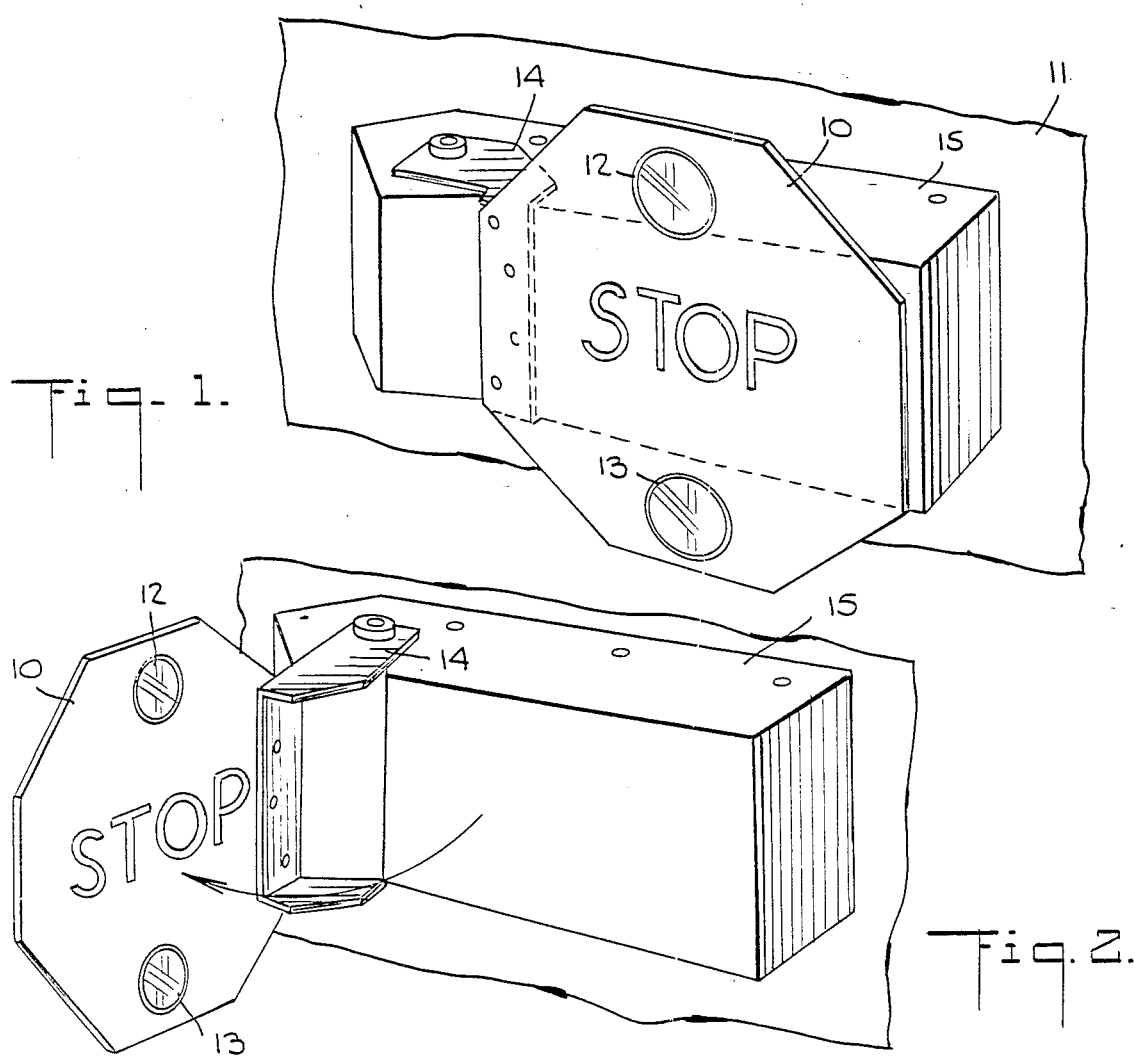
Fig. 1.
Fig. 2.
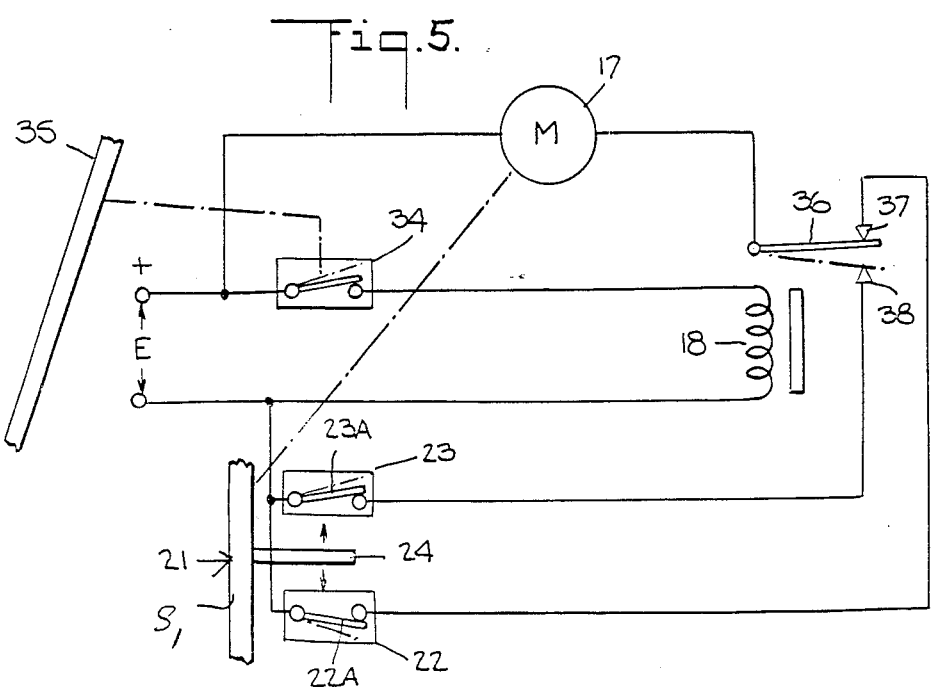
Fig. 5.

SCHOOL BUS STOP SIGN CONTROL APPARATUS

RELATED APPLICATION

This application is a continuation-in-part of my copending application of the same title, Ser. No. 033,110, filed Apr. 1, 1987, now U.S. Pat. No. 4,766,413 whose entire disclosure is incorporated herein by reference.

BACKGROUND OF INVENTION

1. Field of Invention

This invention relates generally to apparatus for controlling the operation of a stop sign on a school bus, and more particularly to a control apparatus that when the door of the bus is opened to unload or load passengers causes the stop sign to swing out to an outstretched position to provide a signal alerting nearby vehicles, and when the bus door is closed, then causes the sign to return to its retracted position.

2. Status of Prior Art

School buses serve to pick up or discharge children attending a school at various points along a route running through the community in which the school is situated. As a safety measure, school buses have for many years been equipped with a stop sign mechanism under the control of the bus driver. This mechanism acts to swing out the stop sign from its normally retracted position against the side of the bus to an outstretched position, thereby providing a signal alerting drivers of nearby vehicles that children are entering or alighting the bus.

U.S. Pat. Nos. 2,384,689 and 3,094,683 are illustrative of manually-operated school bus sign devices, while U.S. Pat. No. 2,252,529 discloses a hydraulically-operated school bus sign.

It is also known to provide motor-operated school bus signals, such apparatus being illustrated in U.S. Pat. Nos. 2,281,717 and 4,138,668. Of greatest prior art interest in this regard is the 1982 U.S. Pat. No. 4,339,744 to Latta, Jr. In this patent, the stop sign mounted on the side of the bus is operated by a unidirectional DC motor and a linkage associated with the sign. This linkage in conjunction with limit switches acts to deploy and retract the stop sign.

The control apparatus disclosed in the Latta et al. patent is operated by the driver by means of a switch having a "deploy" and a "retract" position. The arrangement is such that when the driver sets the switch to its "deploy" position, this also acts to actuate sign lights and bus lights to cause them to flash. These flashing light signals in combination with the outstretched stop sign warn nearby cars that the door of the school bus is then open and children are being loaded or unloaded.

One practical drawback of the Latta et al. stop sign control apparatus is that it is driver operated. Should the bus driver, as sometimes occurs, fail to operate the stop sign switch before opening the door, no warning signal will then be given to alert nearby car drivers. A school bus driver's job is made difficult by the fact that his young passengers are not always well behaved; for school children are often noisy and hyperactive. Hence the conditions which prevail in a bus may distract a bus driver and induce him to forget to operate the stop sign.

Another practical drawback of the Latta et al. stop sign is that it can be damaged or rendered inoperative if the outstretched stop sign is not made to retract by the motor linked thereto but is forced to retract either accidentally or deliberately while the motor is cut off. This action may break the linkage between the stop sign and the motor.

To overcome these drawbacks, the control apparatus disclosed in my copending application, above-identified, us automatically responsive to the opening and closing of the bus door, whereby when the door is opened, the control apparatus then acts to swing out the stop sign to its outstretched position; and when the door is closed, the apparatus then acts to return the sign to its normally retracted position on the side of the bus body. In this control arrangement, a unidirectional motor is operatively coupled to the hinged stop sign through an eccentric drive and link arm. The link arm is associated with limit switches so that in the course of a motor operating cycle the sign is swung to its outstretched position and then returned to its normally retracted position.

In order to prevent damage to the mechanism should an unauthorized attempt be made to forcibly retract the outstretched stop sign, in my prior control apparatus, a breakaway coupling is provided between the link arm operated by the motor and the shaft of the hinge mechanism for the sign. The breakaway coupling which is constituted by several components includes a spring and a cammed sleeve which act when the stop sign is improperly forced to retract, to decouple the stop sign hinge mechanism from the link arm to prevent damage to this arm and the electrical and mechanical components associated therewith.

While there are distinct advantages to be gained by the inclusion of the breakaway coupling in the control apparatus for the bus sign, because this coupling is relatively complex, it adds significantly to the cost of the control apparatus and makes assembly of the apparatus more difficult. Such cost factors play an important role in school bus purchases, for these are usually financed by local community taxes. Hence an automatic stop sign control apparatus for a school bus which is expensive may be ruled out by the community even though it affords an extra measure of safety.

SUMMARY OF INVENTION

In view of the foregoing, the main object of this invention is to provide a relatively low cost and mechanically simple control apparatus for a school bus stop sign which is automatically responsive to the opening and closing of the bus door, the apparatus acting when the door is opened to swing out the stop sign to its outstretched position, and when the door is closed to return the sign to its normally retracted position.

More particularly, an object of this invention is to provide a control apparatus of the above type in which a unidirectional motor is coupled to the hinged sign through an eccentric drive and a link arm having incorporated therein a preloaded, helical compression spring whereby should the hinged sign be forcibly retracted when the motor is not operating, the spring will expand to permit such retraction, the arm being associated with limit switches so that in the course of a motor operating cycle, the sign is swung to its outstretched position and then returned to its normally retracted position.

Also an object of the invention is to provide a bus stop sign control apparatus of simple, efficient and reliable design whereby the apparatus may be assembled and installed at relatively low cost.

Briefly stated, these objects are attained in control apparatus for a hinged stop sign mounted on the side of a school bus to cause the sign to swing out to an outstretched position when the bus door is opened to load or unload passengers and to return the sign to its retracted position when the door closes. The apparatus is provided with a unidirectional motor operatively coupled to the hinged sign through an eccentric drive by a link arm which incorporates a pre-loaded helical compression spring to prevent damage to the link arm should an attempt be made to forcible swing the sign. Two normally-closed limit switches are associated with the link arm whereby in the course of a motor operating cycle, the stop sign is caused by the link arm to swing out to its outstretched position, at which point one limit switch opens, and then to return to its retracted position, at which point the other limit switch opens. The limit switches are included in a control circuit which supplies power to the motor. The control circuit is responsive to a door switch associated with the bus door so that when the door is open, the door switch is then closed, and power is supplied to the motor through one limit switch until the sign reaches its outstretched position, at which point this limit switch is opened to cut off the motor. When the door is closed and the door switch is then open, power is supplied to the motor through the other limit switch until the sign reaches its retracted position, at which point the motor is then cut off. Thus the operation of the sign is coordinated with that of the bus door to provide a stop signal when the need therefor arises.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a front view of a stop sign control apparatus in accordance with the invention in which the stop sign is in its retracted position;

FIG. 2 shows the stop sign in its outstretched position;

FIG. 5 is a schematic diagram of the motor control circuit for the stop sign apparatus.

DESCRIPTION OF INVENTION

The Stop Sign Control Apparatus

Figure 3:
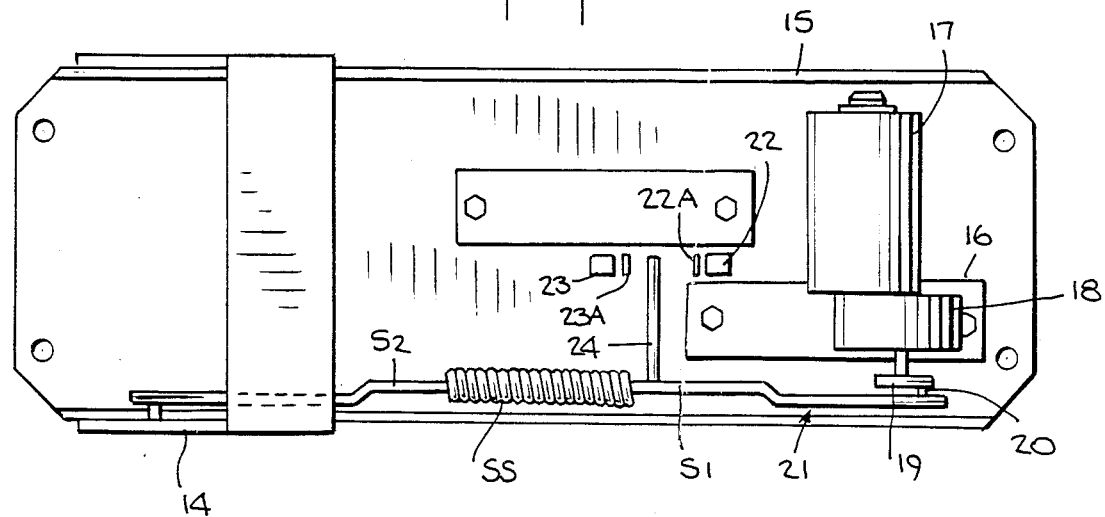
FIG. 3 is a plan view, with the case of the apparatus opened to show the bracket on which the motor and the relay of the apparatus is mounted and the link arm which operatively couples the motor to the hinged sign, the arm incorporating a safety spring.
Figure 4:
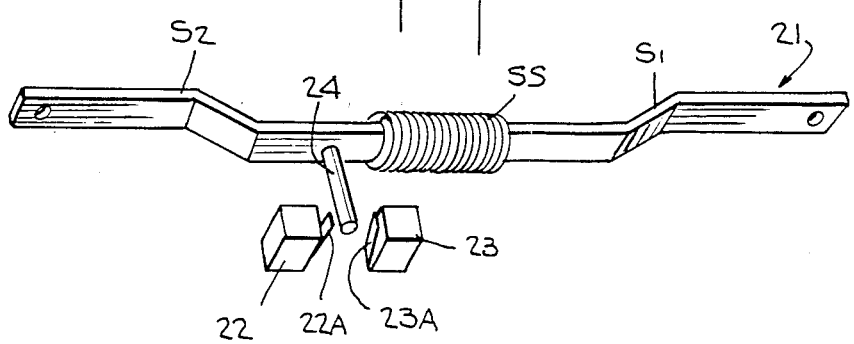
FIG. 4 shows in perspective the link arm of the apparatus.

Referring now to FIG. 1, there is shown a bus stop sign control apparatus in accordance with the invention for swinging a stop sign 10 from its retracted position against the side of a bus 11 to an outstretched position. Stop sign 10 in the embodiment shown is in the form of an octagonal plate provided with flasher lights 12 and 13 above and below a STOP indication. Sign plate 11 is bolted to the hinge plate 14 of a hinge mechanism. The apparatus is supported on a rectangular case 15 which is mounted on the side of the bus.

In operation, when the door of the bus is opened to load or unload passengers, then sign 10 is caused by the apparatus to swing out until it reaches the outstretched position, as shown in FIG. 2, in which position it serves to alert nearby vehicles. At the same time, lights 12 and 13 on the sign are caused to flash periodically to provide a flashing light signal to warn the drivers of nearby vehicles. The lights appear on both sides of the sign.

As shown in FIG. 3, mounted within casing 15 adjacent the rear end thereof is a bracket 16 on which is supported a DC unidirectional gear motor 17. The shaft of motor 17 is coupled through a gear box 18 to an eccentric drive arm 19 provided with an off-center pivot pin 20 coupled to one end of a saftey link arm 21. Thus, when motor 17 is energized, the resultant rotation of eccentric arm 19 causes link arm 21 to undergo a forward stroke to the left and then a return stroke to the right in the course of each cycle of rotation.

Normally-closed limit switches 22 and 23 are supported in spaced relation adjacent link arm 21. Limit switches 22 and 23 are provided with depressible actuators 22A and 23A, respectively, which face each other and when engaged act to open the switches. These actuators are alternatively engaged to open actuator pin 24 laterally mounted on link arm 21. Link arm 21 is operatively coupled at its other end to the shaft of the hinge mechanism for the stop sign and it acts in the course of its return stroke to swing out the stop sign to its outstretched position, and in the course of its forward stroke to return the stop sign to its retracted position.

The relation of actuator pin 24 to actuators 22A and 23A is such that when the stop sign is fully outstretched, limit switch 22 is then actuated and caused to open, and when the sign is fully retracted, then limit switch 23 is actuated and caused to open.

Limit switches 22 and 23 cooperate with relay 18 and a bus door switch to control the supply of power to the motor in a manner whereby when the bus door is opened, the motor then causes the stop sign to swing out to its outstretched position, at which point the motor is disconnected, and when the bus door is closed, the motor then causes the stop sign to return to its retracted position, at which point the motor is disconnected.

The Safety Spring

Link arm 21 is constituted by two like metal strip sections $S_1$ and $S_2$ which are joined together in end-to-end relation by a preloaded helical compression spring SS. This spring safeguards the sign control apparatus against overload on the electrical or mechanical system. Thus if an unauthorized attempt is made when stop sign 10 occupies its outstretched position, as shown in FIG. 2, to manually force the hinged stop sign toward its retracted position, as shown in FIG. 1, this action will cause safety spring SS to stretch to permit this action without, however, affecting the relationship of link arm section $S_1$ to motor 17 or to limit switches 22 and 23.

When the spring is expanded by movement of section $S_2$ which couples one end of the spring to hinge 14 for the stop sign, this action does not displace link arm section $S_2$ linked to motor 17 which is then inactive. And when the manually applied force is released, spring SS then returns to its normally compressed state, and in doing so, returns the stop sign to its outstretched position. Hence the simple spring 22 interposed in the link arm, without any other expedients, prevents damage to the control apparatus.

Motor Control Circuit

Referring now to FIG. 5, there is shown the control circuit for motor 17 which when energized causes link arm 21 to reciprocate to cause the hinged bus stop sign to swing out at its outstretched position and then to return to its retracted position. The actuator pin 24 on the link arm causes the normally-closed limit switch 22 to open when the outstretched position is reached and causes the normally-closed limit switch 23 to open when the retracted position is reached.

The electromagnet coil of relay 18 is connected in series with a door switch 34 to a power source E which in the case of a school bus is the battery of the vehicle. Door switch 34 is operatively associated with the door 35 of the bus so that when the door is open, the switch is closed (as shown), and when the door is closed the door switch is then open.

Relay 18 of the single-pole, double-throw type and its movable contact 36 is connected through motor 11 to the positive terminal of power supply E. Movable contact 36 normally engages a fixed contact 37 which is connected through limit switch 23 to the negative terminal of supply E. When relay 18 is energized upon closure of door switch 34, its movable contact 36 then engages a fixed contact 38 which is connected through limit switch 23 to the negative terminal of supply E.

Limit switches 22 and 23 are shown in their normally closed state. We shall at the outset assume that bus door 35 is closed by the driver, this action causing door switch 34 to open, as a consequence of which relay 18 is de-energized and its movable contact 36 then engages fixed contact 37. In this condition, motor 11 is powered through closed limit switch 23 and the motor then operates through link arm 21 to return the stop sign to its retracted position, at which point actuator pin 24 on the link arm engages the actuator on limit switch 23 to open this switch and cut off the motor.

The bus stop sign remains in its retracted position as long as the bus door is closed. When the driver opens the bus door 35, this action causes door switch 34 to close and thereby enerzgizes relay 18 to cause movable contact 36 to engage fixed contact 38. As a result, motor M is now again energized, this time through closed limit switch 22. The motor then acts through link arm 21 to swing the bus sign to its fully outstretched position, at which point the actuator pin 24 on the link arm engages the actuator 22A of limit switch 22 to open this switch and cut off the motor. The stop sign remains in its outstretched position and the motor remains inactive until the door is again closed, thereby opening door switch 34 to deenergize relay 18, as a result of which motor 17 resumes operation, for it is now powered through contact 37 and closed limit switch 23.

When link arm 25 operated by motor 17 causes the stop sign to reach its fully retracted position, actuator pin 24 then engages the actuator 23A of limit switch 23 to open this switch and cut off the motor, thereby maintaining the bus stop sign at its retracted position until such time as the bus door is again opened.

Thus, the driver of the bus need take no separate action to swing out or retract the stop sign, for the operation of the stop sign is automatically coordinated with the opening and closing of the bus door. The motor control circuit is linked to a flasher unit for the bus light and for lights in the stop sign in the manner disclosed in the Latta Jr. et al. patent, or by any other suitable circuit means, so that whenever the stop sign is fully outstretched, the flasher unit is then actuated.

While there has been shown and described a preferred embodiment of a school bus stop sign control apparatus in accordance with the invention, it wil be appreciated that many changes and modifications may be made therein without, however, departing from the essential spirit thereof. Thus, while it is desirable to provide a door switch to control the operation of the stop sign, in practice one may use a driver-operated manual switch for this purpose.

Also, the control apparatus in accordance with the invention can be used for traffic control purposes other than that provided by a stop sign. Thus, a guard rail may be mounted on the hinge mechanism, and by means of a selective control switch, caused either to swing out to an outstretched position to arrest the flow of traffic or to a retracted position to permit such flow.

I claim:

1. A stop sign control apparatus mountable on the side of a school bus and provided with a hinge mechanism which is caused by the apparatus to swing the sign to an outstretched position when the door of the bus is opened and to return the sign to its retracted position when the door is thereafter closed, said apparatus comprising:

(A) a control switch which is closed when the door is open and is open when the door is closed;

(B) a unidirectional DC motor coupled through an eccentric drive by a link arm to the hinge mechanism to cause the sign in response to movement of the link arm in one direction to swing toward its outstretched position and in response to movement of the link arm in the reverse direction to return to its retracted position, said link arm being constituted by two sections which are joined together by a pre-loaded, helical compression spring, one section being coupled to the eccentric drive and the other section to the hinge mechanism; and (C) a control circuit associated with the control switch to connect a DC power supply to the motor, said circuit including first and second normally-closed limit switches operatively coupled to the other section of the link arm whereby said first limit switch is caused to open when the sign reaches its outstretched position and said second limit switch is caused to open when the sign reaches its retracted position, and means connecting said power supply to said motor either through said first or second limit switch whereby when the control switch is open, said first limit switch is caused to open when the sign reaches its outstretched position to cut off the motor, and when the control switch is closed, said second limit switch is caused to open when the sign reaches its retracted position to cut off the motor, the spring acting when one section of the link arm is displaced by the hinge mechanism as a result of a manual force applied to the stop sign to swing it from its outstretched position toward its retracted position to expend and thereby prevent displacement of the other section.

2. Apparatus as set forth in claim 1, wherein said control switch is a door which is operatively associated with the door.

3. Apparatus as set forth in claim 1, wherein said control circuit includes a replay which is connected through the control siwtch to said power supply and is energized only when the control switch is closed, said replay when energized connecting said motor to the power supply through the second limit switch, and when de-energized connecting said motor to the supply through the first limit switch.

4. A stop sign as set forth in claim 1, wherein said motor is a gear motor, and said eccentric drive is formed by an eccentric arm mounted on the shaft of the motor and an off-center pivot pin on the eccentric arm coupled to the other section of the link arm.

5. A stop sign as set forth in claim 1, wherein said limit switches are mounted in spaced relation and have depressible actuators which face each other, and the other section of the link arm is provided with an actuator pin which moves back and forth in the space between the actuators to alternately engage the actuators.

* * * * *

UNITED STATES PATENT OFFICE
CERTIFICATE OF CORRECTION

Patent No. 4,816,804                    Dated   March 28, 1989

Inventor(s)   James Reavell

It is certified that error appears in the above-identified patent and that said Letters Patent is hereby corrected as shown below:

Column 6, line 59, after "door" insert --switch--.

Column 6, line 63, "siwtch" should read --switch--.

Column 6, line 65, "replay" should read --relay--.

Signed and Sealed this

Twenty-eighth Day of November 1989

Attest:

JEFFREY M. SAMUELS

*Attesting Officer*     Acting Commissioner of Patents and Trademarks